H. CARDWELL.
MACHINE FOR FINISHING TWINE.
APPLICATION FILED SEPT. 26, 1908.
955,943.
Patented Apr. 26, 1910.
3 SHEETS—SHEET 1.
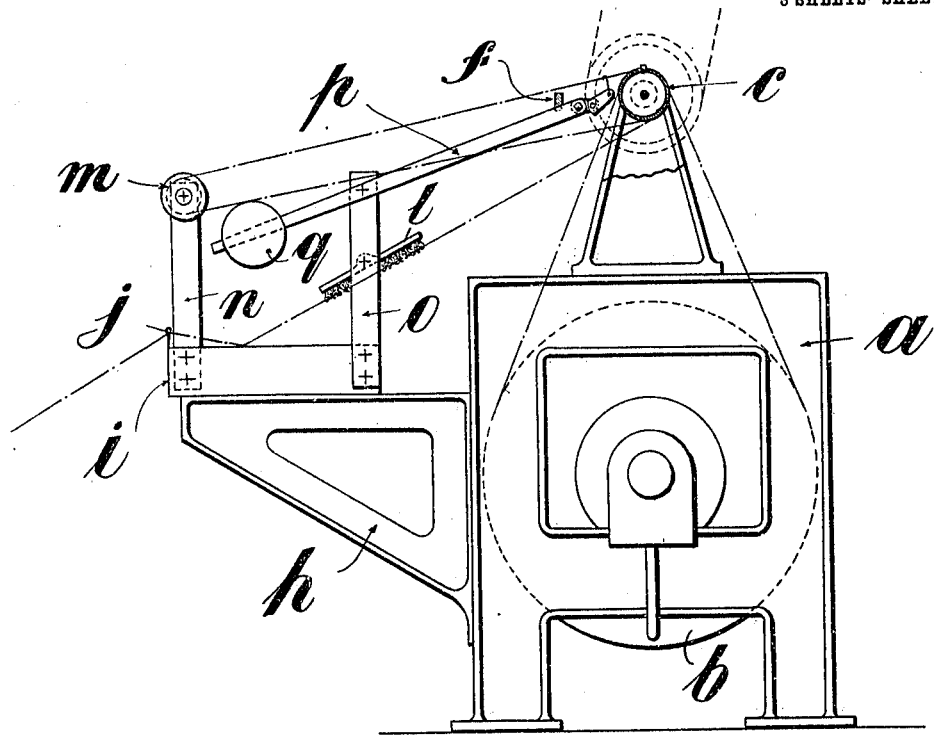
*Fig. 1.*
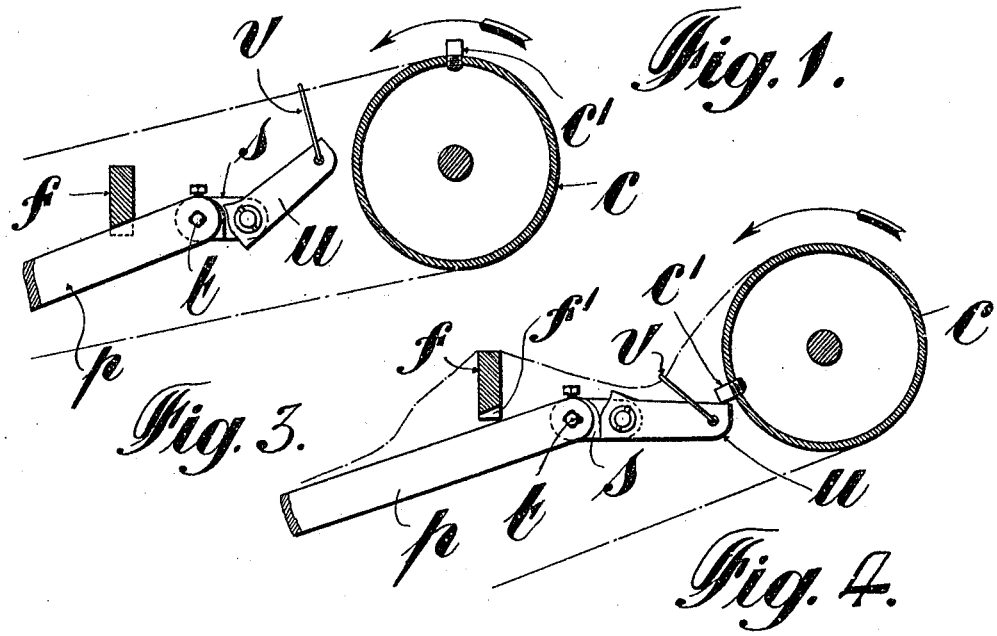
*Fig. 3.*
*Fig. 4.*
Witnesses:—
W. P. Burke
A. F. Heuman
Inventor:—
Harry Cardwell
By his Attorney

H. CARDWELL.
MACHINE FOR FINISHING TWINE.
APPLICATION FILED SEPT. 26, 1908.

955,943.

Patented Apr. 26, 1910.

3 SHEETS—SHEET 3.

Witnesses:
W. P. Burke
A. F. Heuman

Inventor:
Harry Cardwell
By his Attorney

UNITED STATES PATENT OFFICE.

HARRY CARDWELL, OF MANCHESTER, ENGLAND.

MACHINE FOR FINISHING TWINE.

955,943.  Specification of Letters Patent.  Patented Apr. 26, 1910.

Application filed September 26, 1908. Serial No. 454,881.

*To all whom it may concern:*

Be it known that I, HARRY CARDWELL, a subject of the King of Great Britain and Ireland, and resident of Manchester, England, have invented certain new and useful Improvements in or Relating to Machines for Finishing Twine, of which the following is a specification.

This invention refers to machines as used in the sizing and polishing of twine and the like, and it relates to that type of such machines in which only one, or at most two or three ends of twine pass through the machine and which are run at a rapid rate, the twine passing around a large cylinder. With such machines a breakage or intertwisting of the twine is a serious drawback, especially if the flaw is not immediately discovered. At present no means are provided to detect a flaw, and, owing to the rapid rate at which the twine passes through the machine, considerable loss in time and materials may arise before the operator discovers the fault.

The invention has for its object to provide the said type of machine with means whereby the machine will be stopped automatically the instant the twine breaks, or gets entangled and fails to pass forward in the proper manner.

It consists essentially of an arrangement of devices hereinafter described which hold the machine-starting-and-stopping mechanism in the starting position when once set to such position, and of further devices, also hereinafter described, which, when made free, act on the said mechanism and cause it to stop the machine, but which, while the twine is intact and passing forward in the proper manner are prevented acting on the said mechanism.

Figure 2:
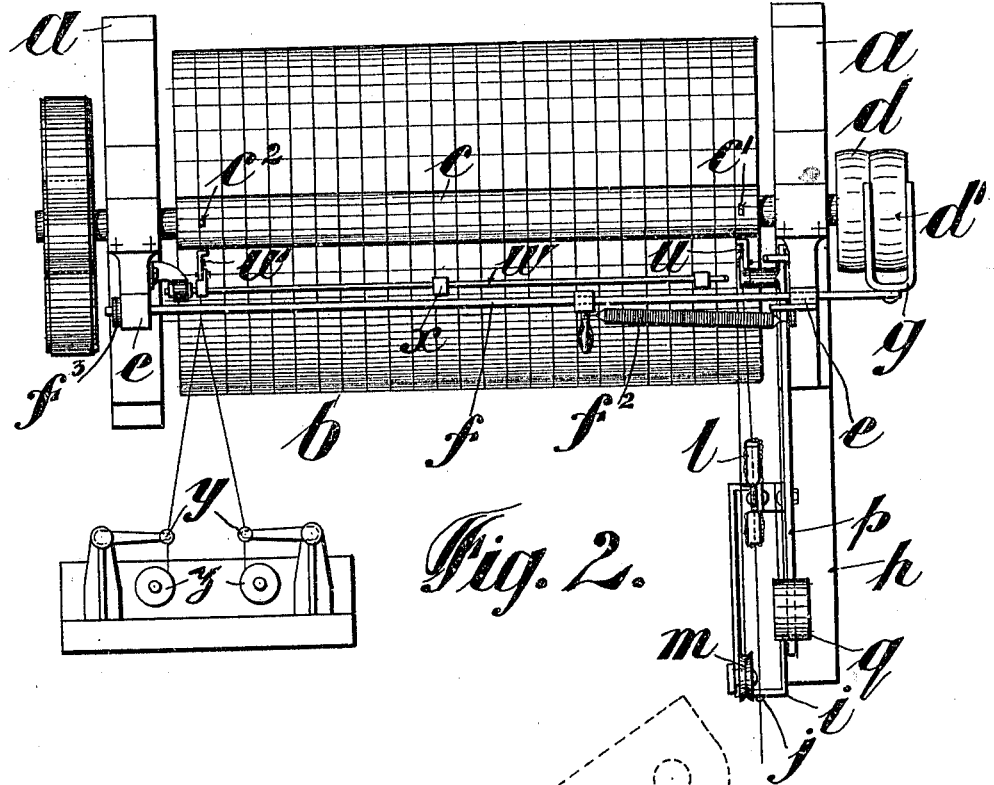
Figure 5:
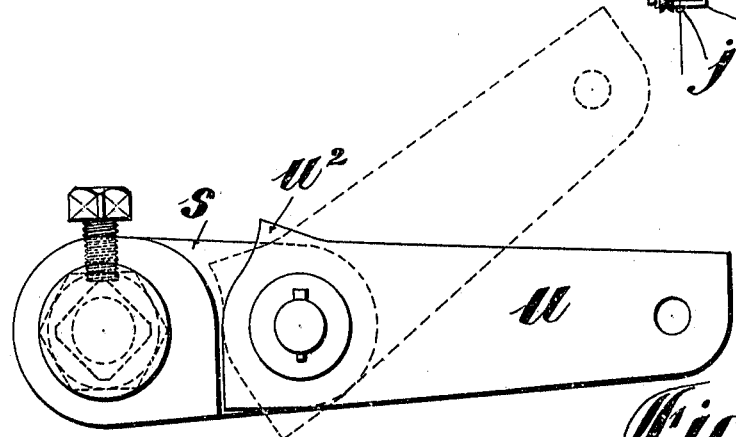
Figure 6:
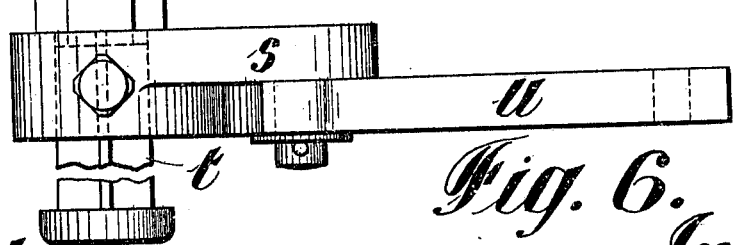
Figure 9:
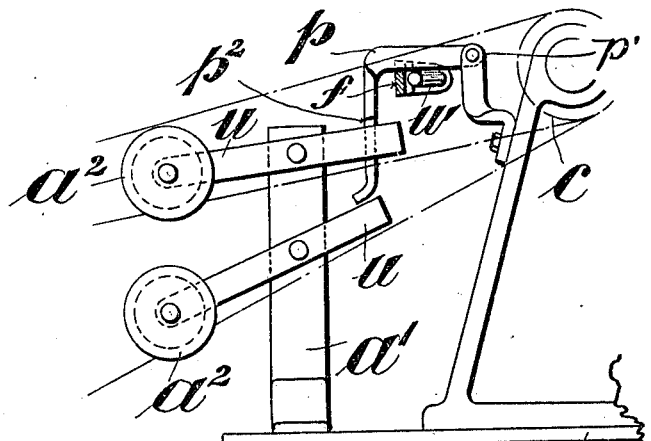
Figure 7:
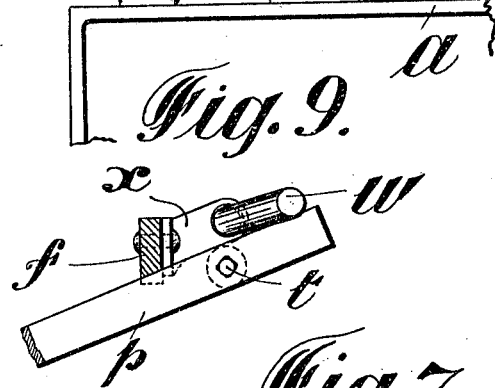
Figure 8:
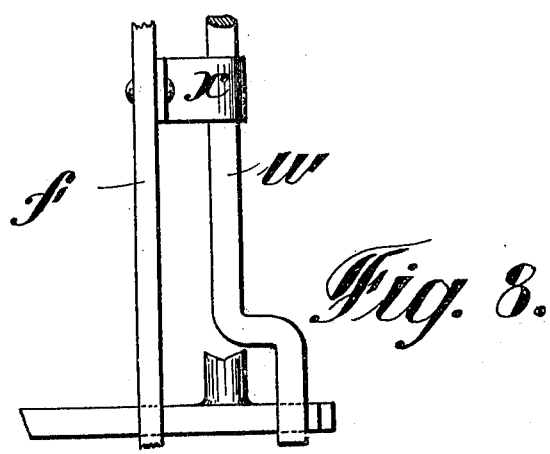

The invention will be best understood by a reference to the accompanying drawing, whereon, Figure 1 illustrates a side elevation, and Fig. 2 a plan of a twine-finishing machine (in part) with the invention applied thereto. Figs. 3 and 4 illustrate side views of an important part of the invention to a larger scale; Fig. 3 showing the position of the parts prior to the twine breaking and Fig. 4 showing the position of the parts after the twine has broken. Fig. 5 illustrates a side view, and Fig. 6 a plan of an important detail. Figs. 7 and 8 illustrate to a larger scale a side view and plan respectively of those parts of the devices used for stopping the machine when the twine gets intertwisted. Fig. 9 illustrates a side elevation of a modified application of the invention.

The machine proper consists of end frames $a$, $a$, a large rotary steam-heated cylinder $b$ and a roller $c$, the axis of this latter being fitted with fast belt pulley $d$ and loose pulley $d'$. Extending across the machine and slidably supported in guide brackets $e$ is a bar $f$, which at one end carries the strap fork $g$.

Upon a bracket $h$ is a size-holding tank $i$ through which the twine to be sized passes prior to entering the machine for polishing, the twine first passing through guide eye $j$, then through the size in the trough, and then, after being relieved of the excess of size by a wiper $l$, passing into the machine.

Usually there are two lengths of twine treated at the same time, and both pass through as one, but when they leave the machine they separate and pass through independent guide eyes on to separate bobbins, see Fig. 2.

According to the ordinary method, the twine, after leaving the sizing tank, passes under and around the roller $c$, then around the cylinder $b$ and then over and around the roller $c$ and again around the cylinder $b$, spiral fashion, until it reaches the opposite end of the machine, where it passes through a suitable delivery guide eye, and is wound on to a reel or bobbin.

According to this invention, the twine, after first passing under and around the roller and before passing down to the cylinder $b$, passes around a guide pulley $m$ carried by say an upright $n$ bolted to the tank side.

Pivotally mounted upon a further upright $o$ is a lever $p$, which extends below, and, by reason of the balance weight $q$, presses against the bar $f$. Connected to the end of the lever is a short extension $s$ held in position by a square bolt $t$, see Figs. 5 and 6. Pivotally connected to such extension is a finger-like lever $u$, the pivoted end of which and the extension $s$ being so formed as to constitute a knuckle or rule joint, whereby the lever is incapable of moving below say a horizontal position but is free to be turned up to an angle of say 45° or more as shown by full and broken lines in Fig. 5.

To the free end of the lever $u$ is connected a hook $v$ and by such hook it is suspended from the twine as it passes from the roller $c$ to the pulley $m$ as shown in Figs. 1 and 3.

In the bar $f$ is a notch $f'$. When the bar is moved to the position for placing the belt on the fast pulley the lever $p$ projects into the notch and prevents the bar, under the pull of spring $f^2$, returning the belt on to the loose pulley.

Fixed to the roller $c$ is a stud or projection $c'$ which is arranged in the plane of the lever $u$ and rotates solidly with the roller.

With the several parts arranged as aforesaid and the free end of the lever $u$ held suspended by the hook from the twine and the twine intact and therefore in full tension, the machine operates and the twine runs through the machine in the ordinary manner. Owing to the end of the lever $u$ being held elevated the roller $c$ is free to rotate and there is room for the stud $c'$ to pass without touching the lever. Immediately, however, the twine breaks the lever $u$ falls to the horizontal and its free end comes in the way of the stud $c'$, which then acting upon the lever $u$ forces it downward and thus lowers the lever $p$ clear of the notch $f'$ in the bar $f$, which latter, under the pull of the spring $f^2$, then instantly moves the belt on to the loose pulley and stops the machine. The attendant, after piecing up the broken ends, rehooks the lever $u$ on to the twine, which then again lies clear of the stud $c'$ and restarts the machine. In thus automatically stopping the machine no waste of twine can take place, and what is equally, if not more important, the loss of time due to stoppages is reduced to a minimum. That is to say, a stoppage under ordinary circumstances often entails the rethreading of the twine through the machine, the breakage not being discovered until the twine has fully been run off the cylinder.

By stopping the machine as soon as the break occurs the restarting of the machine is only the work of a few seconds. When desired there may be a separate knuckle-jointed lever $u$ and a separate stud $c'$ for each length of twine, the lever of the unbroken length of twine readily folding upward when the lever $p$ is depressed. The arrangement so far described serves for stopping the machine when the twine breaks. The arrangement for stopping the machine when the two lengths of twine get entangled as they leave the machine consists of a further knuckle-jointed lever $u'$, see Fig. 2, carried by a rod $w$. This rod is rotatably supported in supports $x$ upon the bar $f$, and also by a bracket fixed to the machine frame. The other end of such rod is cranked and overlies an extension of the lever $p$, see Figs. 2, 7 and 8. Upon the roller $c$ is a further stud or projection $c^2$ which rotates in the plane of the lever $u'$. By means of a small hook the further lever $u'$ is suspended from the twine, and is therefore held out of the way of the projection $c^2$ so long as the twine remains taut and leaves the machine in good order.

Until the twine gets intertwisted it readily separates and each length passes through a guide eye $y$ on to its particular reel or bobbin $z$ as shown in Fig. 2. When, however, the twine gets entangled and the two lengths fail to separate, it ceases to pass on to the bobbins and begins to slacken and accumulate at a point between the machine and the reels, long lengths of the twine often being found on the floor before the fault is discovered. To stop to disentangle the twine is a long job and as a rule the entangled twine is cut away and wasted. With this invention, however, the moment the twine ceases to pass on to the bobbins and slackens as between the roller and the guide eyes, the lever $u'$ falls into the path of the further stud $c^2$, and this latter, pressing upon it, rotates the rod $w$, which then depresses the lever $p$ and frees the bar $f$, which, under the pull of the spring $f^2$, at once stops the machine. In such way it will be seen how we provide for stopping the machine both when the twine breaks as it enters the machine and when two (or more) lengths of twine get entangled as they leave the machine. When only one length of twine passes through the machine, the further lever and stud and rod will not be used, unless it be for use in case the twine breaks at the delivery end of the machine.

Of course, the levers $u$ and $u'$ are hooked to both lengths of twine. To limit the rise of these levers they may be each formed with a spur $u^2$ which will act as a stop on meeting the shoulder of the extension $s$, see Fig. 5. To cushion the action of the bar $f$ when released it is or may be provided with an india-rubber pad or buffer $f^3$.

While preferring the arrangement of parts before described, other and suitable means may be employed, the main requirement being to utilize the breaking, slackening or intertwisting of the twine to bring about the automatic movements of the strap fork and the stopping of the machine, or, in other words, to utilize the tension or non-breaking of the twine to hold the stop-motion devices out of action and to utilize the action of a rotary or moving part to operate such devices when the twine breaks, slackens or gets intertwisted. Of course, the moving part may be constantly moving, or be only set in motion when the twine breaks. In this connection the lever $p$ used for engaging the bar $f$, and the lever $u$ for moving the lever $p$ clear of the bar may take the forms shown in Fig. 9. That is to say, the lever $p$, bent as shown, and its longer arm extending downward, may be pivoted to a bracket $p'$ and overlie the bar $f$, its weight causing it to engage a notch in the bar. The lever $u$ is pivoted to an upright $a'$ and through a pulley $a^2$ its longer arm is suspended from the twine as shown. So long, therefore, as the twine remains intact the lever $u$ is inoperative, but as soon as the twine breaks or slackens the lever arm falls, and raising its shorter arm, presses the lever $p$ upward and clear of the bar $f$ which then automatically stops the machine. It will thus be seen that the lever $u$ is the operative member for freeing the bar $f$ but until released by the breaking of the twine it is practically stationary. To afford an additional safeguard, there may be two levers $u$, see Fig. 9, one supported by the twine as it passes from the size box to the roller $c$ and the other supported by the twine as it passes from the pulley $m$ to the roller $c$. Each lever will be free to operate independently of the other, and the lever $p$ will have a shoulder at $p^2$ against which the upper lever will bear when the twine breaks.

While the arrangement shown in Fig. 9 may be used at the inlet end of the machine, the knuckle-jointed lever will preferably be used at the outlet end, because at this latter the tension of the twine is not so great, and does not allow of a delicate action of the parts. The rod $w$ will extend forwardly, instead of backwardly, at the end nearest the bracket $e$ in order that when operated it will lift the lever $p$.

What I claim is:—

1. In machines for sizing and polishing twine and the like, the combination of a steam-heated rotary cylinder, a roller mounted near to and parallel with the cylinder, bearings for the cylinder and roller, a stud on the roller near one end, means for imparting rotary motion to the cylinder and roller, a pulley and a size holding trough, twine guiding devices in said trough, a motion controlling bar parallel with and near to the roller and said bar having a notch in one edge, supporting means for the bar in which the bar may slide, a lever and pivot support therefor, one arm of the lever normally engaging the notch in the bar and the other arm of the lever carrying a counter-weight, a short lever extension pivoted to the arm of the lever which engages the notch in the bar, the pivoted end of the extension being shaped to allow of an upward movement above the horizontal but prevent a downward movement below the horizontal, and means for suspending the free end of the extension from the twine as it passes between the roller and pulley, a further stud on the roller near the other end, a rod rotatably supported by the bar, and at one end cranked and overlying that end of the lever which engages the notch on the bar, a short lever arm pivoted to the rod the pivoted end of the lever arm being shaped to allow of upward movement above the horizontal and prevent movement below the horizontal, means for suspending the free end of the lever arm from the twine as it leaves the roller, and a spring connected to the bar at one end and to one of the roller bearings at the other end for the purpose of moving the bar endwise when disengaged by the lever, as set forth.

2. In machines for sizing and polishing twine and the like, the combination of a steam-heated rotary cylinder, a roller mounted near to and parallel with the cylinder, bearings for the cylinder and roller, a stud on the roller near one end, means for imparting rotary motion to the cylinder and roller, a pulley and a size-holding trough, twine guiding devices in said trough, a motion controlling bar parallel with and near to the roller and said bar having a notch in one edge, supporting means for the bar in which the bar may slide, a lever and pivot support therefor, one arm of the lever normally engaging the notch in the bar and the other arm of the lever carrying a counter-weight, a short lever extension pivoted to the arm of the lever which engages the notch in the bar, the pivoted end of the extension being shaped to allow of an upward movement above the horizontal but prevent a downward movement below the horizontal, means for suspending the free end of the extension from the twine as it passes between the roller and pulley, and a spring connected to the bar at one end and to one of the roller bearings at the other end for the purpose of moving the bar endwise when disengaged by the lever, as set forth.

3. In machines for sizing and polishing twine and the like, the combination of a steam-heated rotary cylinder, a roller mounted near to and parallel with the cylinder, bearings for the cylinder and roller, a stud on the roller near one end, means for imparting rotary motion to the cylinder and roller, a pulley and a size holding trough, twine guiding devices in said trough, a motion controlling bar parallel with and near to the roller and said bar having a notch in one edge, supporting means for the bar in which the bar may slide, means for urging the bar into the motion-stopped position, means for keeping the bar out of the motion stopped position, and means adapted to lie in the path of the stud and be acted on by the stud and thus free the bar, or to be held clear of the stud and prevent the bar being made free, substantially as herein set forth.

4. In machines for sizing and polishing twine and the like, the combination of a steam-heated rotary cylinder, a roller mounted near to and parallel with the cylinder, bearings for the cylinder and roller, a stud on the roller near one end, means for imparting rotary motion to the cylinder and roller, a pulley and a size holding trough, twine guiding devices in said trough, a motion controlling bar parallel with and near to the roller and said bar having a notch in one edge, supporting means for the bar in which the bar may slide, a lever and pivot support therefor normally engaging the notch in the bar, and means whereby on the twine breaking or becoming slack the lever is caused to disengage the bar, substantially as herein set forth.

In witness whereof I have hereunto set my hand in the presence of two witnesses.

HARRY CARDWELL.

Witnesses:
 FRED. J. MEREDITH,
 GEO. F. WHITEWAY.